United States Patent [19]

Bird

[11] Patent Number: 5,167,108
[45] Date of Patent: Dec. 1, 1992

[54] LAWN MOWER TRIMMER ATTACHMENT

[76] Inventor: Joseph J. Bird, 27W024 Jewell Rd., Winfield, Ill. 60190

[21] Appl. No.: 774,452

[22] Filed: Oct. 10, 1991

[51] Int. Cl.$^5$ .................... A01D 34/66; A01D 34/84; A01D 50/02; A01D 75/00
[52] U.S. Cl. .................................... 56/13.7; 56/10.4; 56/11.6; 56/11.3; 56/11.8; 56/16.9; 56/12.7
[58] Field of Search .................... 56/13.7, 13.6, 16.9, 56/11.3, 11.6, 11.8, 10.4, DIG. 9, 12.7

[56] References Cited

U.S. PATENT DOCUMENTS

| | | | |
|---|---|---|---|
| 2,960,811 | 11/1960 | Roesel | 56/10.4 |
| 3,183,651 | 5/1965 | Hoefler | 56/10.4 |
| 3,490,213 | 1/1970 | Pinto | 56/16.9 |
| 3,531,922 | 10/1970 | Hansen | 56/13.7 |
| 3,668,845 | 6/1972 | Parker | 56/11.6 |
| 3,782,085 | 1/1974 | Parker et al. | 56/11.6 |
| 3,901,004 | 8/1975 | Barnes | 56/17.3 |
| 4,170,099 | 10/1979 | Owens | 56/16.9 |
| 4,453,372 | 6/1984 | Remer | 56/13.7 |
| 4,896,488 | 1/1990 | Duncan et al. | 56/13.7 |
| 5,040,360 | 8/1991 | Mechleder | 56/13.7 X |
| 5,048,276 | 9/1991 | Miller | 56/16.9 |

*Primary Examiner*—Stephen J. Novosad
*Attorney, Agent, or Firm*—Varnum, Riddering, Schmidt & Howlett

[57] ABSTRACT

A power lawn mower is provided with a trimmer attachment pivotally attached to the mower deck and positioned adjacent a side edge of the deck to trim those areas not accessible to the mower blade. When a fixed obstacle such as a fencepost or tree is encountered, the attachment is rotated on a pivotal support arm against the force of a spring to a position adjacent the rear edge of the mower deck. When the obstacle has been passed, the force of the spring returns the trimmer to the side edge of the mower deck. The trimmer attachment is operated by a drive belt driven from the lawn mower engine and the trimmer attachment support arm includes a pair of overlapping telescoping members and a spring contained in one of the telescoping members to apply an outward force on the other telescoping member resulting in a positive tension being applied to the drive belt. The trimmer attachment may be retracted to the rear edge of the mower deck by operation of a lever mechanism and a link attached to the support arm. A stop member on the mower deck defines a limit of travel for the support arm and continued application of force to the lever causes the telescoping support arm to be shortened and the drive belt to be disengaged from the trimmer head.

17 Claims, 3 Drawing Sheets

LAWN MOWER TRIMMER ATTACHMENT

BACKGROUND OF THE INVENTION

The invention relates to power lawn mowers and particularly to trimmer attachments for power lawn mowers.

Power lawn mowers, particularly riding lawn mowers have greatly reduced time and effort required for lawn mowing. A recognized problem with riding lawn mowers is that it is difficult to mow adjacent to trees and fences and other objects. Typically, a smaller, hand-guided mower or a hand-operated trimmer is used to trim such areas.

Prior U.S. Pat. No. 4,896,488 issued Jan. 30, 1990, discloses a trimmer attachment for a hand-guided lawn mower. The trimmer attachment is rigidly attached to one side of the mower and includes a drive pulley which is driven by a belt engaging a motor-driven pulley. The trimmer can be pivoted from its normal mowing position to a vertical position when the drive belt is removed from the trimmer pulley. Such an arrangement does not lend itself to be readily moved out of the path of an obstacle such as a fence post or the like. It can be pivoted upward when the drive belt is removed and in its pivoted position extends beyond the side of the mower. A further shortcoming of the arrangement disclosed in this patent is that there does not appear to be a convenient way of lengthening the whip line or flail member when it becomes shortened due to wear.

U.S. Pat. No. 2,960,811 issued Nov. 22, 1960, discloses an especially constructed mower deck for supporting a main mower blade in a fixed position and having arcuate slots for movably supporting smaller mower blades. The smaller units are forced to a position partially extending beyond a side edge of the mower deck by means of a spring and are moved to a position under the mower deck against the force of the spring when an obstacle such as a fencepost is encountered. A problem with this arrangement is that a special deck construction is required having arcuate slots and space under the deck to accommodate the smaller blade assembly. Furthermore, the smaller blade assemblies can only partially extend beyond the side edge of the mower deck since their drive shafts are supported in arcuate slots in the deck.

SUMMARY OF THE INVENTION

These and other problems of the prior art are overcome in accordance with the principles of this invention by adding a grass trimmer attachment to a standard mowing deck of a lawn mower, preferably a riding lawn mower or lawn tractor. A support arm is pivotally mounted on the mower deck to support a trimmer adjacent one side edge of the deck to trim those areas not accessible by the blade of the mower deck. A retaining spring retains the trimmer in position adjacent the side edge of the deck. When a fixed obstacle such as a fence post or tree is encountered by the trimmer, the trimmer is rotated on its pivotal support arm against the force of the spring to a position adjacent a rear edge of the mower deck. Advantageously, when the obstacle has been passed, the force of the spring returns the trimmer to the side edge of the mower deck. Advantageously, the trimmer is rotated only to the extent necessary to avoid the obstacle and continues its trimmer action while being rotated to the obstacle-avoiding position.

In accordance with one embodiment of the invention, the trimmer attachment is provided with a control lever connected to the outer end of the support arm for rotating the support arm against the force of the spring to the position adjacent the rear edge. In a particular embodiment of the invention, the pivoting arm comprises a horizontally extending part comprising a first telescoping member attached to the one end of the support arm engaging the spindle and a second telescoping member attached to the other end of the support arm on which the trimmer is mounted. The two telescoping members are engaged in an overlapping telescoping fashion and a spring provides a resisting force in the direction of increasing overlap of the telescoping parts. Advantageously, the spring provides tension on the drive belt for driving the trimmer. A stop member may be provided for preventing the trimmer from moving beyond a predetermined position adjacent the rear edge of the deck. The control lever is adapted to provide a force to the trimmer having a component in the direction of the telescoping horizontal part of the support arm and the control lever is operative to force the telescoping members in the direction of overlap, whereby belt tension is released and the trimmer drive pulley is disengaged from the belt.

In one particular embodiment of the invention, the control lever comprises a linearly movable handle, a rotatable crank linked by a first interconnecting member to the trimmer end of the support arm, and a second interconnecting member interconnecting the handle and the crank to impart a pivoting motion to the crank and the support arm in response to a linear movement of the handle.

In a particular embodiment of the invention, the spindle is positioned at a relatively higher plane than the trimmer drive pulley, and the support arm comprises a horizontally extending section supporting the trimmer and a curved extending downwardly from the spindle to the horizontal section. In accordance with a further aspect of the invention, the trimmer comprises a hub and a shaft engaging a drive pulley, and the shaft comprises an outer shaft having a central passageway extending vertically therethrough and an inner shaft disposed in the passageway. The trimmer hub has an outer cover portion engaging the outer shaft and a reel engaging the inner shaft. The inner shaft has a length which is greater than the outer shaft, and a spring tends to maintain the relative position of the two shafts in such a manner that the top portion of the inner shaft extends a distance beyond the top portion of the outer shaft. Depressing the inner shaft against the force of the spring causes the reel, attached to the inner shaft, to be moved in a downward direction. The outer housing and the reel of the trimmer hub are each provided with lugs whereby the outer housing engages the reel causing the two parts to spin in unison. A temporary depressing of the inner shaft causes the reel to be momentarily disengaged from the outer housing and results in a further extension of the whip line from the reel. Advantageously, when the whip line becomes shortened due to wear, it may be readily extended by temporarily depressing the inner shaft.

BRIEF DESCRIPTION OF THE DRAWING

An illustrative embodiment of the invention is described herein with reference to the drawing in which.

DETAILED DESCRIPTION

Figure 1:
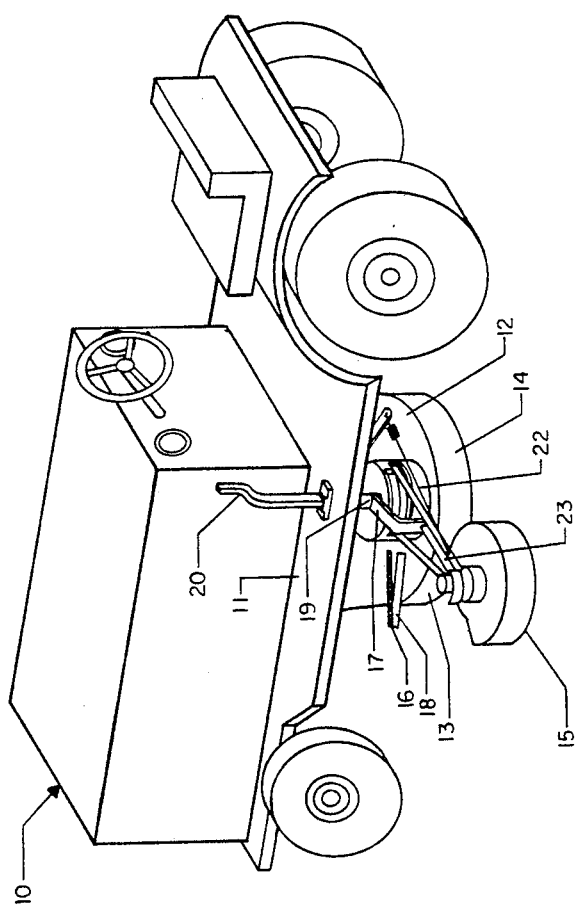
FIG. 1 is a perspective view of a lawn tractor provided with a trimmer attachment embodying the principles of the invention.

FIG. 1 is a perspective view of a lawn tractor shown generally at 10 provided with a mower deck 12. A trimmer attachment consisting of a trimmer head 15 is supported by means of a support arm 17 pivotally engaging a spindle 19 mounted on the mower deck 12. The trimmer head 15 is shown in the normal mowing position adjacent a side edge 13 of mower deck 12. When the trimmer head 15 encounters a fixed obstacle such as a fence post or a tree, it is rotated to a position near the rear edge 14 of mower deck 12. After the obstacle has been passed, trimmer head 15 is returned to its original position by force of a spring 16 which engages an attachment bracket 18 attached to mower deck 12. A control lever 20, mounted on the deck 11 of the tractor, is connected by means of a wire or other interconnecting member 22 to an outer end 23 of the support arm 17. Operation of the control lever 20 causes the trimmer head 15 to be pulled toward the tractor deck 11 and to a position adjacent the rear edge 14 of the mower deck 12.

Figure 2:
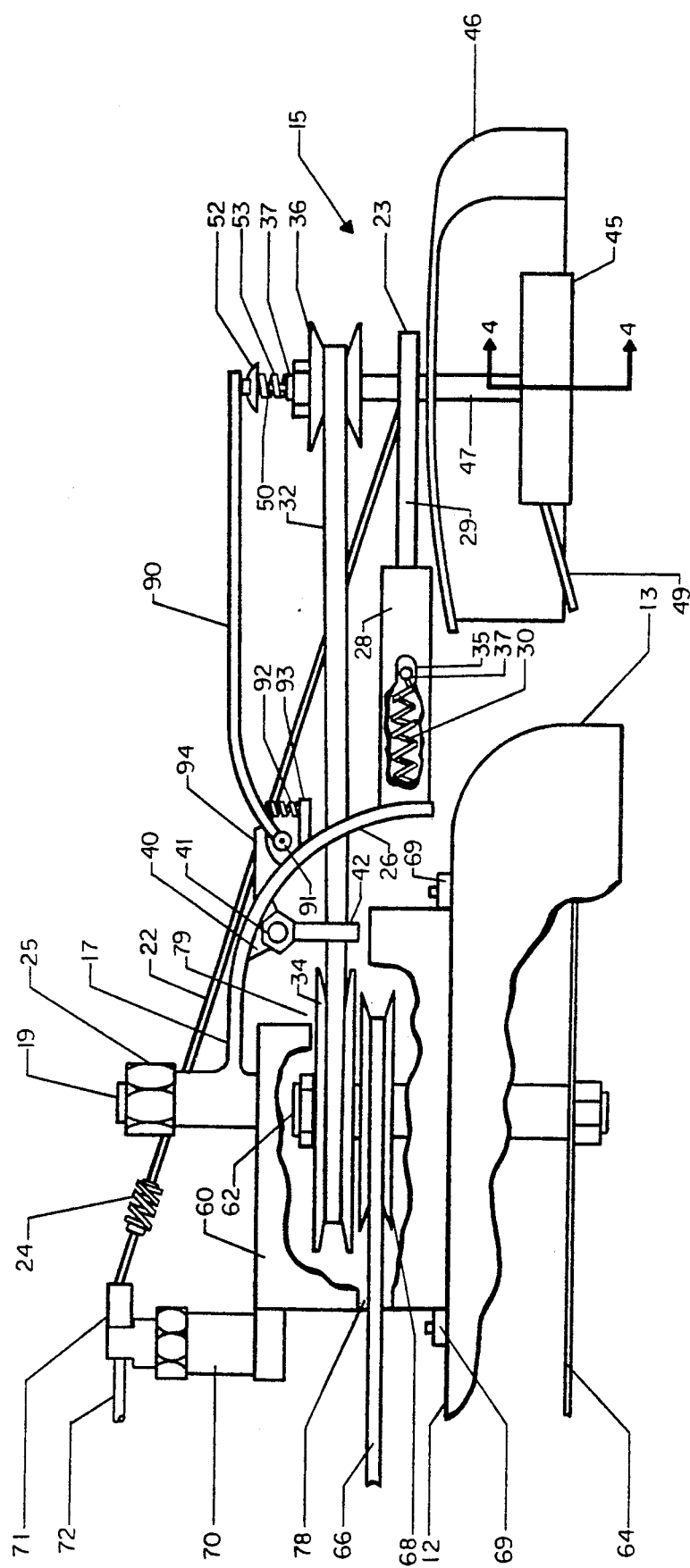
FIG. 2 is a frontal elevation of the trimmer attachment of FIG. 1.

FIG. 2 is an enlarged fragmentary frontal view of the trimmer attachment and mower deck. FIG. 2 shows the support arm 17 engaging the spindle 19 and retained thereon by a retaining nut 25. The support arm 17 comprises a curved section 26 and a horizontally extending section comprising two telescoping members 28 and 29. Members 28 and 29 are engaged in a telescoping fashion, and a spring 30 internal to the outer telescoping member 28 exerts a force on the inner telescoping member 29 in the outward direction. This force provides tension on drive belt 32. Drive belt 32 engages a drive pulley 34 and trimmer pulley 36. Belt 32 is maintained in engagement with pulleys 34 and 36 by force of the spring 30. The outer telescoping member 28 is provided with a slot 35 accommodating a pin 37 which extends through the inner telescoping member 29 to maintain the two members in a rotationally fixed orientation with respect to each other.

The trimmer head 15 includes a trimmer hub 45 driven by means of shaft 47 from pulley 36. A flailing member or cutting string 49 extends from the hub 45 to perform the trimming function when the hub 45 is rotated. The shaft 47 extends through outer end 23 of the support arm 17 and engages pulley 36. A retaining nut 37 fastens the pulley 36 to shaft 47. Shaft 47 comprises a central passageway, and an inner shaft 50 extends through the passageway in shaft 47 and is vertically movable in the passageway. Shaft 50 is provided with an end cap 52 and depression of the shaft 50 by a force exerted on end cap 52 acts on the hub 45 to allow string 49 to be extended as it becomes shortened from wear, as will be explained further later herein with respect to FIG. 4. A spring 53 tends to force shaft 52 in the upward direction. A trip lever arm 90 is hingedly attached to support arm 17 by means of a hinge 91. The trip lever arm may be pressed down to depress inner shaft 50 against the force of spring 53 to advance the cutting string 49. A further spring 92, acting against spring support 93, may be used to force lever arm 90 in an upward direction and against stop 94.

The spindle 19 is attached to the upper surface of a housing 60. The housing 60 is shown in partial cutaway view to expose drive pulley 34 and parts of shaft 62. Shaft 62 extends through the mower deck 12 to a standard mowing blade 64 and is driven by means of a belt 66 driving a standard mower deck pulley 68. Belt 66 is directly or indirectly connected to a lawn tractor motor power drive in a standard fashion. The housing 60 may be conveniently attached to the mower deck 12 by means of attachment lugs 69. Attached to the housing 60 is a pivot support 70 and a rotating bell crank 71 to which the interconnecting wire 22 is attached through a spring 24, and interconnecting rod 72 is operated by operation of the control lever 20 to rotate the bell crank 71 when the trimmer head 15 is to be retracted. Trimmer head 15 is further provided with a safety shield 46 which partially covers the hub 49. A brake bracket 42, an L-shaped bracket attached to support arm 17 by means of a bolt 41, engages brake support 40. Brake bracket acts to inhibit movement of belt 32 when the trimmer assembly is moved to a fully retracted position near a rear edge of mower deck 12. In that position, belt 32 will be in a slack condition and will engage an edge of opening 79 in housing 60. Brake bracket 42 will engage belt 32 in that position to prevent it from moving when it is in the slack condition.

Figure 3:
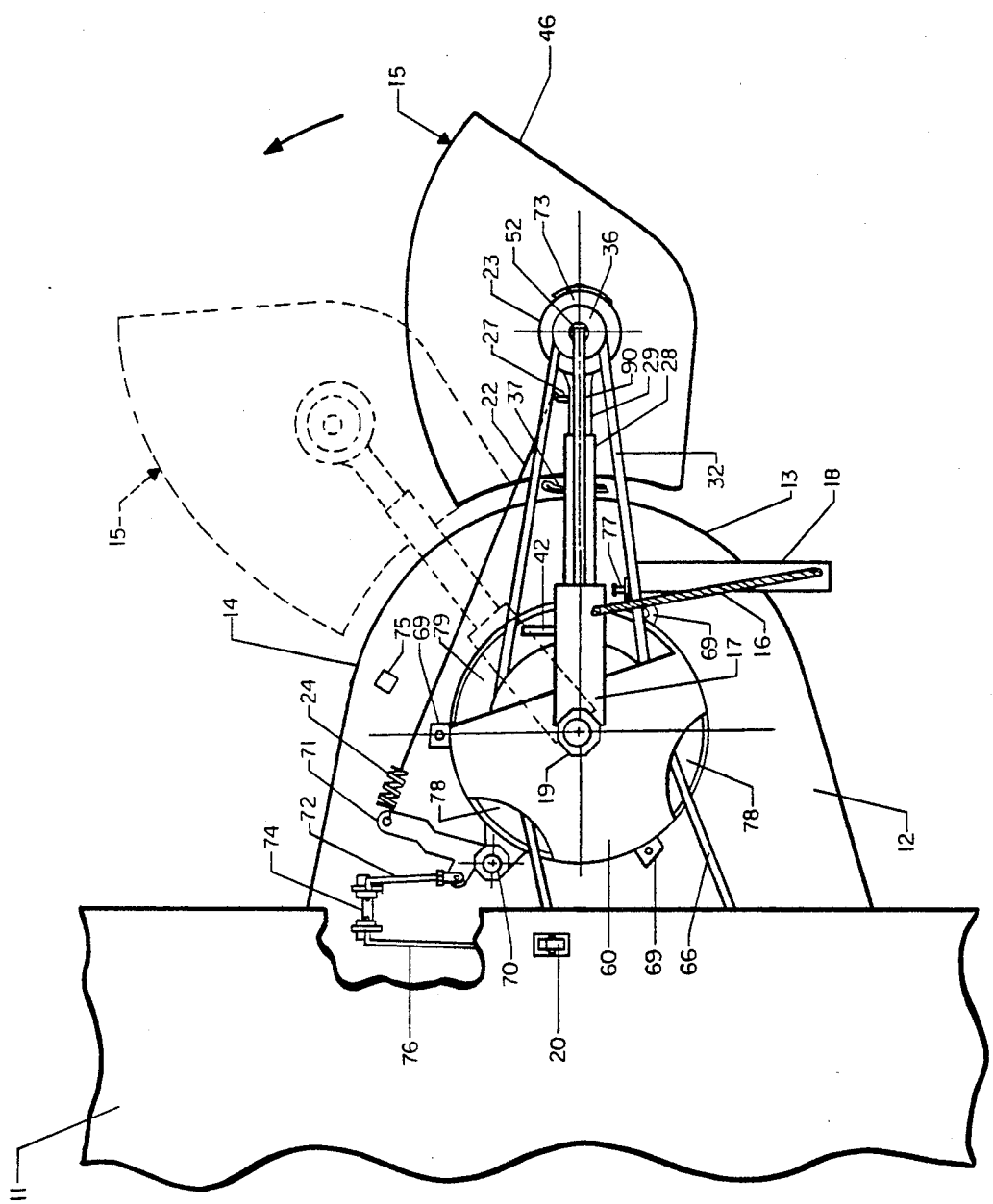
FIG. 3 is a diagrammatic plan view of the trimmer attachment of FIG. 1.

FIG. 3 is a schematic plan view showing the trimmer head 15 in its normal cutting position adjacent side edge 13 of mower deck 12, in solid line drawing. A partially retracted position of the trimmer head 15 is shown in phantom. The bell crank 71 connected via wire 22 and spring 24 to a retracting hook 27 serves to draw the trimmer head 15 to a retracted position as the bell crank is rotated. Bell crank 71 is connected via connecting rod 72 to a pivoting bracket 74. Pivoting bracket 74 is connected by means of connecting rod 76 to the control lever 20. Linear motion of the control arm 20 is translated into pivoting motion of the bracket 74 and horizontal rotational motion of bell crank 71 to retract the trimmer head 15 A rear stop 75 limits the travel of support arm 17 and trimmer head 15. When a retracting force is applied to connecting wire 22 after the rear stop 75 has been encountered, the inner telescoping portion 29 will be advanced into the outer telescoping portion 28 causing the tension on belt 32 to be slackened and to be disengaged from normal frictional contact with pulley 36. In this fashion, trimmer head 15 may be disengaged when in its fully retracted position. When the control lever 20 is operated to the released position, the trimmer head 15 will be returned to the outboard position adjacent side edge 13 as a result of the force of spring 16 on support arm 17. A forward stop 77 prevents the trimmer head 15 from moving too far forward. The control lever 20 may be conveniently located on the upper surface of the tractor deck 11 and extend through the surface to connecting rod 76. Pivoting bracket 74 may be conveniently positioned on mower deck 12. Control lever 20 may be provided with a ratchet mechanism or other standard mechanism for retaining the control lever at a desired position, thereby retaining the trimmer head 15 at a selected position.

An alternative arrangement for retracting the trimmer head 15 employs a cable disposed in a flexible sheath and provided with a locking mechanism for maintaining the cable at a selected position. Such cables are commercially available and are commonly referred to as vernier cables. The operator end of the sheath may be dash mounted and the opposite end may be anchored in the vicinity of the bell crank 71 and the movable cable attached to the bell crank.

A bearing collar 73, forming an integral part of the inner telescoping section 29 of support arm 17, is provided with a bearing for supporting the vertically extending shaft to which pulley 36 is attached. Further shown in FIG. 3 are openings 78 and 79 in housing 60 to accommodate belts 66 and 32, respectively.

Figure 4:
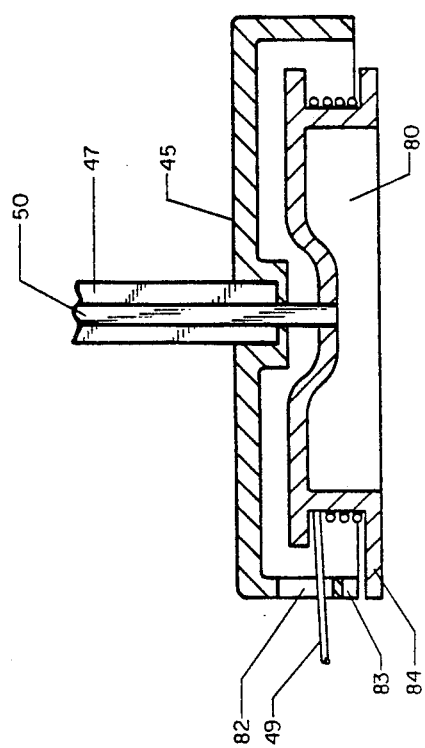
FIG. 4 is an enlarged fragmentary frontal elevation of the trimmer attachment of FIG. 1.

FIG. 4 is a cross-sectional view along the line 4—4 of FIG. 3 and showing a reel 80 in a lowered position in which it is disengaged from the hub 45. This position occurs when the trip lever arm 90 (FIG. 2) is depressed. FIG. 4 shows the shaft 47 engaging trimmer hub 45. The inner shaft 50 extends through a central passageway in shaft 47 and engages a reel 80. A length of cutting string shown at 49 is wound around the reel 80 and extends through an opening 82 in the side wall of hub 45. The hub 45 is provided with three equally spaced reel engagement notches 83. Furthermore, reel 80 is provided with three equally spaced, horizontally extending hub engagement lugs 84 which engage notches 83 of hub 45 when reel 80 is in its normal running position. Since hub 45 engages shaft 47, hub 45 rotates as shaft 47 rotates and engagement of lugs 84 with notches 83 causes the reel to be rotated in unison with the hub 45. However, when the inner shaft 50 is temporarily moved to the lowered position, lugs 84 on reel 80 are disengaged from notches 83 and the hub 45 will tend to rotate at a different rotational speed than the reel 80. Assuming that the hub rotates in a clockwise direction and the string 49 is wound on the reel 80 in a counterclockwise direction, a disengagement of reel 80 from hub 45 will result in an effective rotation in the clockwise direction with respect to reel 80, and additional length of string 49 will be fed through the opening 82. When the inner shaft 50 is returned to its released position, the reel 80 will once again engage the hub 45 to provide the desired trimming action of string 49.

It will be understood that the above description is only illustrative of the principles of the invention and that numerous other embodiments may be devised by those skilled in the art without departing from the spirit and scope of the invention.

What is claimed is:

1. In combination, a power mower and a trimmer attachment;
   said power mower comprising a mower deck having an upper wall and a side edge and a rear edge, and a power drive pulley;
   said attachment comprising:
   a vertically extending spindle attached to said upper wall;
   a support arm having one end pivotally engaging said spindle and having another end opposite said one end supporting a vertically extending trimmer drive shaft;
   a trimmer hub having a flail member attached thereto and mounted on a bottom portion of said trimmer drive shaft;
   a trimmer drive pulley engaging an upper end of said trimmer drive shaft; and
   a drive belt engaging said power drive pulley and said trimmer drive pulley;
   said support arm pivotable on said spindle for selective positioning of said trimmer head adjacent said side edge and adjacent said rear edge of said mower deck.

2. The combination in accordance with claim 1 wherein said attachment further comprises a spring connected to said support arm for urging said support arm toward a position in which said trimmer hub is generally adjacent said side edge, whereby said arm is moved to said position adjacent said rear edge of said mower deck when said power mower is moved in a forward direction and said trimmer hub engages a fixed obstacle, and said arm is returned to said position adjacent said side edge by said spring.

3. The combination in accordance with claim 2 and further comprising a forward stop member for preventing said arm from moving beyond a predetermined position adjacent said side edge.

4. The combination in accordance with claim 2 and further comprising a control lever connected to said other end of said support arm for pivoting said arm against said force of said spring to said position adjacent said rear edge.

5. The combination in accordance with claim 4 and further comprising a rear stop member for preventing said arm from moving beyond a predetermined position adjacent said rear edge.

6. The combination in accordance with claim 4 wherein said control lever comprises a linearly movable handle, a rotatable crank, a first interconnecting member interconnecting said crank and said other end, and a second interconnecting member interconnecting said handle and said crank to impart a pivoting motion to said crank and said support arm in response to said linear movement of said handle.

7. The combination in accordance with claim 1 wherein said support arm comprises a horizontally extending part comprising a first telescoping member attached to said one end and a second telescoping member attached to said other end, said telescoping members engaging in an overlapping telescoping fashion, and a spring for providing an expansion force for forcing said ends in opposite directions, whereby tension is applied to said drive belt engaging said power drive pulley and said trimmer drive pulley.

8. The combination in accordance with claim 7 and further comprising a control lever connected to said other end of said support arm for rotating said arm toward said position adjacent said rear edge and to force said telescoping members in a direction of overlap, thereby releasing tension on said drive belt.

9. The combination in accordance with claim 8 and further comprising a brake member attached to said arm for engaging said drive belt when said telescoping members are forced in said direction of overlap.

10. The combination in accordance with claim 7 wherein said spindle is positioned at a relatively higher plane than said trimmer drive pulley and said support arm comprises a curved portion extending downwardly from said spindle to said first telescoping section.

11. The combination in accordance with claim 1 wherein said trimmer shaft comprises an outer shaft having a central passageway extending vertically through said shaft and an inner shaft disposed in said passageway, wherein said outer shaft engages said trimmer drive pulley and said hub and wherein said hub comprises a reel engaging said inner shaft and having a first position wherein said reel is in engagement with said hub and said reel is rotated in unison with said hub and having a second position wherein said reel is disengaged from said hub, said reel having a length of cutting string disposed thereon having one end extending through a side opening in said hub, whereby said string is extended from said reel through said opening when said reel is disengaged from said hub.

12. The combination in accordance with claim 11 wherein said outer shaft comprises an upper edge and said inner shaft has an upper shoulder having an edge opposing said upper edge of said outer shaft, and further comprising a spring disposed between said upper shoulder edge and said upper edge of said outer shaft for urging said shaft in an upward direction for positioning said reel in said first position in engagement with said hub and wherein depression of said inner shaft against said spring causes said reel to be moved to said second position and an additional length of cutting string to be fed through said side opening in said hub.

13. The combination in accordance with claim 12 and further comprising a trip lever arm engaging said inner shaft and operable for depressing said inner shaft against said spring.

14. The combination in accordance with claim 12 wherein said reel is engaged to said hub by engaging a lug with a corresponding notch.

15. The combination in accordance with claim 1, and further comprising a support housing for providing cover for said drive pulley and having an upper wall, and wherein said spindle is mounted on said upper wall.

16. The combination in accordance with claim 13 wherein said housing is provided with at least one opening for accommodating said drive belt.

17. A trimmer attachment for mounting on a mower deck having a power drive pulley, an upper wall, a side edge and a rear edge, said attachment comprising:
   a trimmer head including a trimmer drive pulley for engagement with said power drive pulley, a trimmer hub having a flail member attached thereto and a trimmer drive shaft extending between said trimmer drive pulley and said trimmer hub;
   a vertically extending spindle for attachment to said upper wall;
   a support arm comprising telescoping members and having one end pivotally engaging said spindle and having another end engaging said head and an expansion spring in said telescoping members for forcing said head away from spindle;
   a control lever connected to said trimmer head for rotating said trimmer head to said position adjacent said rear edge and to force said telescoping members in a overlapping direction against said expansion spring.

* * * * *